No. 862,553. PATENTED AUG. 6, 1907.
Z. GILLESPIE.
TRACTION WHEEL.
APPLICATION FILED APR. 4, 1907.

WITNESSES:

INVENTOR
Zacharias Gillespie,
BY
G. C. Kennedy.
ATTORNEY

UNITED STATES PATENT OFFICE.

ZACHARIAS GILLESPIE, OF BENTON COUNTY, IOWA.

TRACTION-WHEEL.

No. 862,553. Specification of Letters Patent. Patented Aug. 6, 1907.

Application filed April 4, 1907. Serial No. 366,281.

*To all whom it may concern:*

Be it known that I, ZACHARIAS GILLESPIE, a citizen of the United States of America, and a resident of Benton county, Iowa, have invented certain new and useful Improvements in Traction-Wheels, of which the following is a specification.

My invention relates to improvements in traction-wheels, and the object of my improvement is to provide the wheels of a traction-engine or other heavy vehicle with extensible tire-cleats for use in passing over soft or slippery surfaces. This object I have accomplished by the means which are hereinafter shown and described, and which are illustrated in the accompanying drawings, in which—

Figure 1:
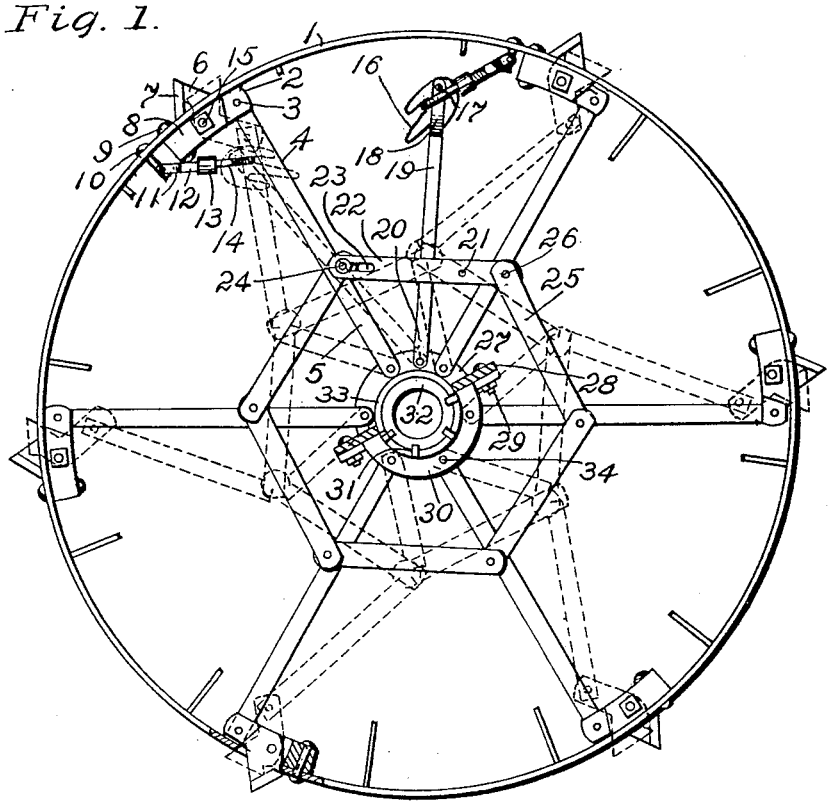
Figure 2:
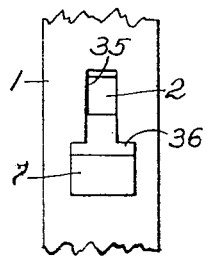
Figure 3:
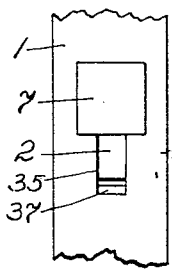
Figure 4:
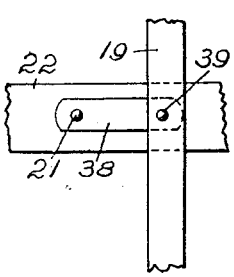
Figure 5:
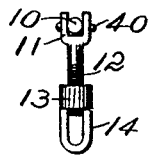
Figure 6:
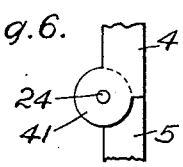

Figure 1 is a side elevation of a traction-wheel equipped with my improved extensible tire-cleats. Fig. 2 is an enlarged detail of such a cleat when projected to its farthest extent from the tire. Fig. 3 is a detail view of the said cleat when withdrawn to lie flat against the outer periphery of the tire. Fig. 4 is a detail, showing the swinging-connection between the hand-lever and one of the slats pivoted to the jointed arms of the extensible cleats. Fig. 5 is an enlarged detail view of the swing-hook used to secure the hand-lever in one position, and Fig. 6 is an enlarged detail view of the prop-joint of the cleat-arms.

Similar numbers refer to similar parts throughout the several views.

My improved traction-wheel has a hub 32 and a tire-rim 1. The tire-rim 1 has a plurality of rectangular peripheral openings or slots 35 which serve as bearings for the stems 2 of the cleats 6. The latter are of triangular form, but have lugs 36 on each side, whose ends are adapted to contact with the outer surface of said tire near the edges of the openings 35 to hold said cleats in a fixed position. The stems 2 are pivoted on bolts 15 within bearing-boxes 8, the latter being secured to the inner periphery of the tire-rim by means of the bolts 9. The inner ends of the stems 2 are pivoted on studs 3 projecting from the sides of the outer ends of the members 4 of the two-part links 4—5. The two-part links referred to are formed of the members 4 and 5 pivotally connected by prop-joints 41 on a pivot 24. The inner end of each member 5 is pivoted on a stud-bolt 20, set in the channel between the two flanges 30 of a sleeve 33, the latter secured to the hub 32 by clips 31. Said sleeve is formed of two members 27—30, each having external lugs secured together by means of the bolts 29. The slats 25 are pivotally connected between the two-part links 4—5 as shown, on the projecting ends of the pivots 24—26 so as to form a polygonal figure with the front end of each slat overlapping the rear end of the preceding slat. The slat 22 however, while forming one of said series of slats, has a slidable connection at its front end by means of a slot 23 which contains the pivot 24, the latter slidable in said slot, to insure ease in the movements of the parts. A hand-lever 19 has its inner end pivoted on a stud-bolt in the channel between the flanges on said sleeve. The outer end of said lever is provided with a fork 18 in which is pivoted a clutch device 16, having a hook on each side, said clutch being movable on the pivot-bolt 17. To the inner end of a bolt 10 secured to the tire-rim 1 at a predetermined location forward of said lever 19, is pivoted the forked end 11 of a threaded-arm 12 on a pivot-bolt 40. An interiorly-threaded sleeve or nut 13 works adjustably on the threaded end of the arm 12 and is provided with a loop 14 adapted to engage one of the hooks on the clutch-device 16, when the lever 19 has been thrown to its extreme forward position. A similar swing-arm and loop is connected to said tire-rim 1 at the proper place back of said lever 19, whereby said lever can be secured in its extreme rearward position. The clutch 16 and loop 14 are secured together by passing the loop over said hook on the clutch and then turning the clutch to a position where the loop has gone by the point of dead-center of the device. The lever 19 is pivoted on a pivot 39 to one end of a link 38, the other end of said link being pivoted on a pivot 21 to the slat 22. This swing-connection prevents binding of the lever in operation.

When the vehicle is passing over a smooth road of medium density and contour, the cleats 6 need not be thrown out, but the lever 19 is left in its extreme forward position, as indicated by the dotted lines in Fig. 1, where said dotted lines also indicate the respective positions of the moving parts of the device at that time. However, when it is desired to project the cleats 6 to the position shown in the full lines in said figure, the lever 19 is thrown back to its extreme backward place, and secured to the rim 1 by means of the connected clutch-device 16 and the swinging-connection 14. In this position, the cleats 6 have their lugs 7 in bearing-contact with the outer periphery of the tire, and are thus locked into a fixed position. The cleats 6 may be varied in shape from the triangular form if desired, and as many used as desired. Said cleats may also be made as wide as the tire itself, but I prefer the width shown as being less liable to breakage by reason of contacting with hard objects at the edge of the tire.

Having described my invention, what I claim as new, and desire to secure by Letters Patent, is—

1. A device of the character described, consisting of the combination with the hub and rim of a traction-wheel, of extensible cleats pivotally connected to said rim, and prop-jointed two-part links each having one member pivotally connected to said hub and the other member pivotally connected to said extensible cleats.

2. A device of the character described, consisting of the combination with the rim and hub of a traction-wheel, of bearing-openings in said rim and outwardly extensible claws in said openings pivotally connected to said rim, two-part prop-jointed links each having one member pivotally connected to said hub and the other member pivotally connected to said claws, and pivotally connected links between the prop-joints of said two-part links.

3. A device of the character described, consisting of the combination with the rim and hub of a traction-wheel, of radially extensible spurs pivotally connected to said rim, links pivotally connected to said spurs and to said hub, links between and connecting the former links together, a lever fulcrumed to said hub, and pivotally connected with said latter links, and means for securing said lever to said rim in either its extreme forward or rear position.

4. A device of the character described, consisting of the combination with the rim and hub of a traction-wheel, of a sleeve secured about said hub having parallel circumferential flanges spaced apart, pivot bolts connecting said flanges, radially extensible cleats having stems pivotally connected to said rim, two-part prop-jointed links one member of each being pivoted on a pivot-bolt between said sleeve-flanges and the other member pivoted to one of the stems of an extensible cleat, slats pivotally connected between said two-part links, a lever having a swinging-connection to one of said slats, and having its inner end fulcrumed to said sleeve, and fastening means adapted to detachably secure said lever to said rim in either its extreme forward or back position.

Signed at Waterloo, Iowa, this 16th day of March, 1907.

ZACHARIAS GILLESPIE.

Witnesses:
M. E. KENNEDY,
O. D. YOUNG.